Aug. 11, 1964  H. C. MEDLEY  3,144,125
SPIRAL CONVEYOR INCLUDING DISASSEMBLY MEANS
Filed Dec. 26, 1961
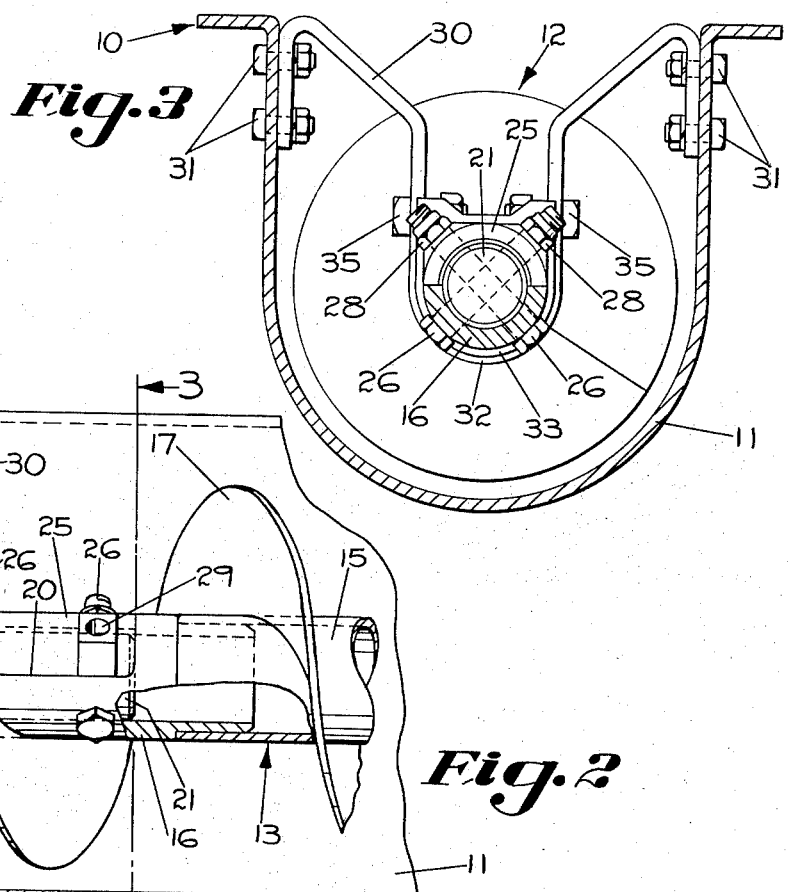
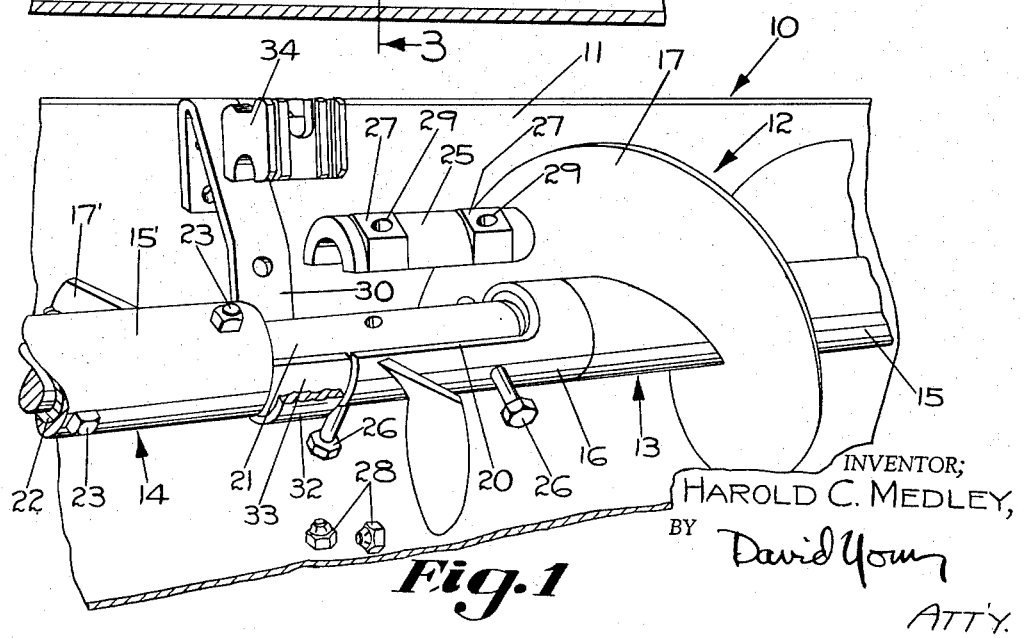
INVENTOR;
HAROLD C. MEDLEY,
BY David Young
ATTY.

United States Patent Office 3,144,125
Patented Aug. 11, 1964

3,144,125
SPIRAL CONVEYOR INCLUDING
DISASSEMBLY MEANS
Harold C. Medley, New Albany, Ohio, assignor to Jeffrey
Galion Manufacturing Company, a corporation of Ohio
Filed Dec. 26, 1961, Ser. No. 162,101
1 Claim. (Cl. 198—213)

The instant invention relates to spiral conveyors, and more particularly to a spiral conveyor in which a single conveyor section may be removed without requiring disassembly of the whole conveyor.

Spiral conveyors are customarily formed of a plurality of conveyor sections, each of which includes a shaft on which there is wound a spiral for feeding material along a trough. The several sections of the spiral conveyor are placed end to end and joined to each other to form the full length of the conveyor. Servicing of the conveyor may involve only one of the conveyor sections. In order to remove one of the conveyor sections, it is normally required that the conveyor be completely disassembled, which, of course, is unnecessarily troublesome and time-consuming, when it is only desired to remove a single conveyor section. By the instant invention there is provided a spiral conveyor construction which permits the removal of only a single conveyor section, thereby avoiding the aforementioned problem.

It is, accordingly, the object of the instant invention to provide an improved spiral conveyor construction in which it is possible to remove a single conveyor section from the assembly.

It is another object of the instant invention to provide an improved spiral conveyor construction in which adjacent conveyor sections are joined to each other by a connecting shaft element received in a seat formed in the end of one conveyor section, to permit the conveyor sections to be readily separated from each other, whereby a single conveyor section may be removed from the assembly.

Other objects of the invention will appear hereinafter, the novel features and combinations being set forth in the appended claims.

In the drawings:

FIG. 1 is a perspective view of a portion of a spiral conveyor constructed in accordance with the instant invention, with certain parts being exploded;

FIG. 2 is a side elevational view, partially in section, of a portion of a spiral conveyor constructed in accordance with the instant invention; and FIG. 3 is a sectional view of the spiral conveyor, taken on the line 3—3 in FIG. 2.

Referring to the drawings, there is illustrated therein a spiral conveyor assembly 10, comprising an elongated trough 11, within which there is disposed a spiral conveyor 12. The spiral conveyor 12 comprises a first conveyor section 13 and a second conveyor section 14, which are identically formed. The conveyor sections 13, 14 are aligned with each other, end to end, in the trough 11 for feeding material longitudinally of the latter.

The first conveyor section 13 has a longitudinally extending shaft 15 which may be formed of ordinary pipe. A shaft extension or bushing 16 is secured to the end of the shaft 15, as by welding. A spiral flight 17 is wound on the shaft 15, including the shaft extension 16, and is secured to the latter, as by welding. Upon rotation of the shaft 15, the spiral flight 17 operates in the trough 11 in the manner of a screw to feed the material in a longitudinal direction.

The second conveyor section 14 similarly comprises a longitudinally extending shaft 15′, around which there is wound a spiral flight 17′. The material in the trough 11, which is fed forwardly by the spiral flight 17, is picked up by the spiral flight 17′ to continue the feed of the material along the trough 11.

The shaft extension or bushing 16 is cut away in a diametral plane to form a seat 20 for one end of a connecting shaft element 21. The adjacent end of the shaft 15′ has a bushing 22 fitted therein, and the other end of the connecting shaft element 21 is received within the bushing 22. A pair of bolts 23 extend through the shaft 15′, the bushing 22 and the connecting shaft element 21, for fixedly securing these elements together. The bolts 23 are preferably disposed on diametral lines that are crossed with respect to each other; as illustrated herein, the bolts 23 may be set at right angles relative to each other.

The connecting shaft element 21 extends from the shaft 15′ to the shaft 15, where the connecting shaft element 21 is received in the seat 20. Since the seat 20 is open in a diametral plane, the connecting shaft element 21 may be placed therein in a lateral direction. A cap 25 overlies the connecting shaft element 21 in the seat 20, and is formed as a portion of the shaft 15. The cap 25 fits the seat 20, but need not closely fit the connecting shaft element 21, as seen in the drawings. The cap 25 and the connecting shaft element 21 are secured to the shaft extension 16 by a pair of bolts 26, which extend through the shaft extension 16, the connecting shaft element 21 and the cap 25. The bolts 26 are disposed on diametral lines which are crossed with respect to each other and, as shown herein, the bolts 26 may be disposed at right angles to each other. Thus, the bolts 26 securely and fixedly hold the connecting shaft element 21 in the seat 20, even though the cap 25 may not engage the connecting shaft element 21. The cap 25 is formed with flat lands 27 for the nuts 28 of the bolts 26. The cap 25 includes a pair of bolt holes 29 at each side thereof, making a total of four bolt holes 29, only two of which are used in assembling the conveyor 12. However, the four bolt holes 29 are so provided to permit use of the same cap 25 with a conveyor flight 17 that is wound in either direction on the shaft 15, it being understood that it is necessary to have clearance from the spiral flight 17 for insertion and removal of the bolts 26.

The adjacent ends of the shafts 15, 15′, are spaced from each other, with a portion of the connecting shaft element 21 being disposed therebetween. The portion of the connecting shaft element 21 which is disposed between the adjacent ends of the shafts 15, 15′ is received in a hanger 30, which provides an intermediate support for the spiral conveyor 12. The hanger 30 is secured to the walls of the trough 11 by a plurality of bolts 31, and extends inwardly into the center of the trough. The hanger 30 is formed with a centrally disposed cradle 32 which receives a lower bushing part 33, within which the connecting shaft element 21 is rotatably seated. An upper bushing part 34 is seated in the cradle 32 of the hanger 30, overlying the connecting shaft element 21. The upper bushing part 34 is secured to the hanger 30 by oppositely disposed bolts 35. The bushing parts 33, 34 rotatably support the connecting shaft element 21 in the hanger 30, and there is thereby provided an intermediate support for the spiral conveyor 12.

When it is desired to remove one section of the spiral conveyor 12, for example, the second conveyor section 14, the bolts 26 are removed, releasing the cap 25 and thereby freeing the connecting shaft element 21 from the seat 20. The upper bushing part 34 is also removed, and the near end of the second conveyor section 14 is thus freed. The opposite end of the second conveyor section 14 is similarly formed as the first conveyor section 13, and it is disassembled by removal of the cap from that end of the second conveyor section 14. The conveyor section 14 is then rotated by hand through 180°, whereby it may be lifted out of the trough 11 without disturbing any of the remaining conveyor sections. The opposite procedure is followed for reassembling the conveyor sections. By the spiral conveyor construction disclosed herein, there is thus provided a means for readily removing a single conveyor section from the conveyor assembly, without the necessity of tearing down the whole conveyor.

Obviously those skilled in the art may make various changes in the details and arrangement and parts without departing from the spirit and scope of the invention as defined by the claim hereto appended, and applicant therefore wishes not to be restricted to the precise construction herein disclosed.

Having thus described and shown an embodiment of the invention, what it is desired to secure by Letters Patent of the United States is:

In a spiral conveyor formed of at least two aligned conveyor sections each comprising a shaft and a spiral flight wound around the shaft, a connecting shaft element for joining adjacent ends of a pair of shafts to each other, one of said shafts including a seat for said connecting shaft element, said seat being open in a diametral plane, a cap overlying said connecting shaft element and said seat, said one shaft including a first radially disposed junction surface at each side of said connecting shaft element, said cap being formed with a second radially disposed junction surface at each side of said connecting shaft element, said first and second radially disposed junction surfaces being aligned with each other for bearing engagement of the first and second junction surfaces, said seat, said connecting shaft element and said cap being formed with a pair of bores extending therethrough on diametral lines which are crossed with respect to each other, a pair of bolts extending through said bores of said seat, the connecting shaft element and the cap for fixedly securing said connecting shaft element to said one shaft and for fixedly securing said cap to said one shaft with said first and second junction surfaces at each side bearing on each other, said bolts being disposed on diametral lines which are crossed with respect to each other, and said bolts being releasable for separation of said conveyor sections by removal of said cap and removal of said connecting shaft element from said seat.

References Cited in the file of this patent
UNITED STATES PATENTS

| | | |
|---|---|---|
| 1,016,748 | Howland | Feb. 6, 1912 |
| 2,279,201 | Kozak | Apr. 7, 1942 |
| 2,524,948 | Whitney | Oct. 10, 1950 |
| 2,849,105 | Touton | Aug. 26, 1958 |